(12) United States Patent
Nito

(10) Patent No.: US 8,245,138 B2
(45) Date of Patent: Aug. 14, 2012

(54) RECORDING AND/OR REPRODUCING APPARATUS FOR DISPLAYING OPERATING STATUS THEREOF AND A METHOD OF DISPLAYING A CONTENT OF OPERATION

(75) Inventor: Naomi Nito, Kanagawa (JP)

(73) Assignee: Sony Corporation (JP)

( * ) Notice: Subject to any disclaimer, the term of this patent is extended or adjusted under 35 U.S.C. 154(b) by 672 days.

(21) Appl. No.: 11/888,770

(22) Filed: Aug. 2, 2007

(65) Prior Publication Data

US 2008/0052625 A1  Feb. 28, 2008

(30) Foreign Application Priority Data

Aug. 22, 2006 (JP) ................................ P2006-225680

(51) Int. Cl.
*G06F 3/00* (2006.01)
(52) U.S. Cl. ....................................................... 715/719
(58) Field of Classification Search .................. 715/720, 715/719
See application file for complete search history.

(56) References Cited

U.S. PATENT DOCUMENTS

| | | | | |
|---|---|---|---|---|
| 6,198,544 | B1 * | 3/2001 | Wess et al. ...................... | 358/296 |
| 7,061,535 | B2 * | 6/2006 | Misawa et al. ................. | 348/375 |
| 7,319,490 | B2 * | 1/2008 | Kanamori et al. ............. | 348/375 |
| 7,355,620 | B2 * | 4/2008 | Ikehata et al. ............. | 348/14.03 |
| 2001/0026263 | A1 * | 10/2001 | Kanamori et al. ............. | 345/156 |
| 2004/0046887 | A1 * | 3/2004 | Ikehata et al. ........... | 348/333.12 |
| 2005/0081164 | A1 * | 4/2005 | Hama et al. .................... | 715/830 |
| 2009/0172598 | A1 * | 7/2009 | Yamanaka et al. ............ | 715/841 |

FOREIGN PATENT DOCUMENTS

| | | |
|---|---|---|
| JP | 08-235680 A | 9/1996 |
| JP | 2003-110911 A | 4/2003 |
| JP | 2004227393 A | 8/2004 |
| JP | 2006079281 A | 3/2006 |
| WO | WO 2006059450 A1 * | 6/2006 |

OTHER PUBLICATIONS

Office Action from Japanese Application No. 2006-225680, dated Aug. 3, 2010.

* cited by examiner

*Primary Examiner* — William Bashore
*Assistant Examiner* — Henry Orr
(74) *Attorney, Agent, or Firm* — Lerner, David, Littenberg, Krumholz & Mentlik, LLP

(57) ABSTRACT

Disclosed is a recording-reproduction apparatus having a recording-reproduction unit which includes an operation unit and an output unit. The operation unit has an operation element. The recording-reproduction unit further includes a control unit that displays a discrimination figure displaying the current operating status of the recording-reproduction apparatus in the center of the operating-content-viewing region and generates a display command signal for displaying a plurality of discrimination figures in the periphery of the discrimination figure displaying the current operating status. The discrimination figures are provided as guiding signs to which contents of recording or reproduction operations are assigned. The output unit is provided for outputting a display signal prepared from the display command signal generated from the control unit.

7 Claims, 9 Drawing Sheets

AR1

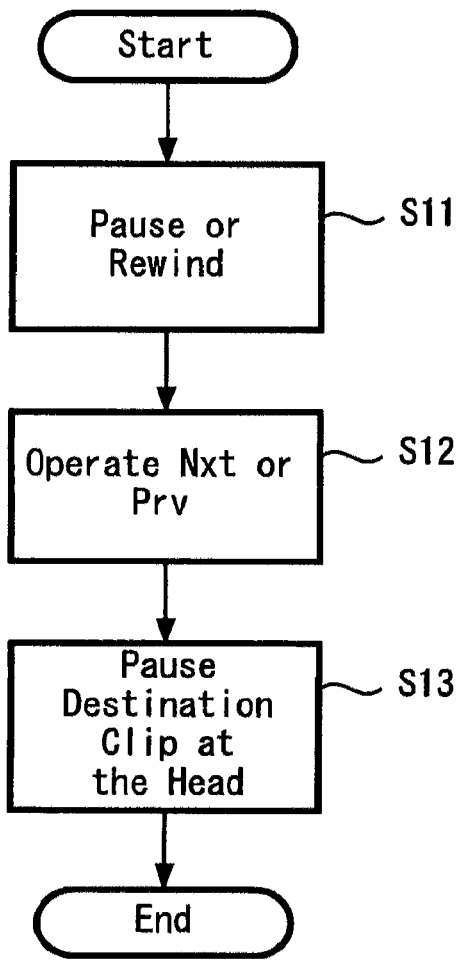
*FIG. 6A*
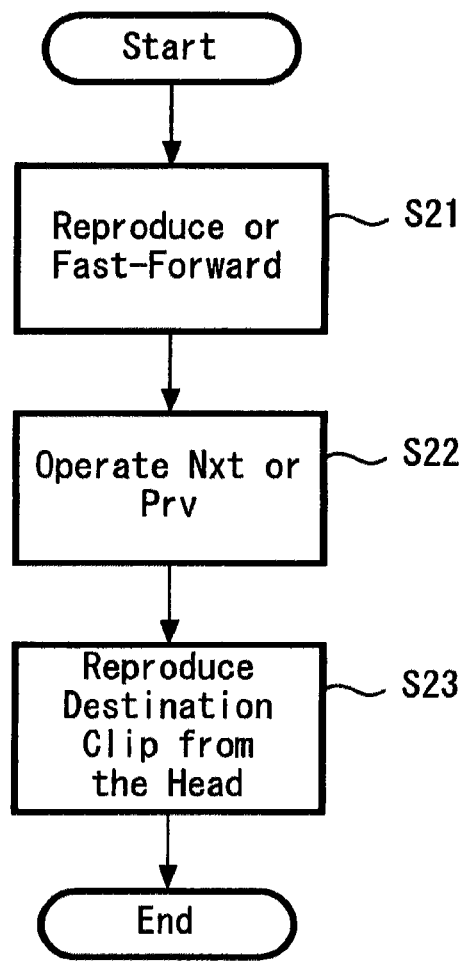
*FIG. 6B*
*FIG. 7*
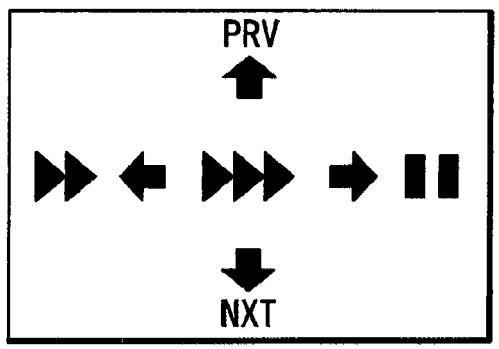

RECORDING AND/OR REPRODUCING APPARATUS FOR DISPLAYING OPERATING STATUS THEREOF AND A METHOD OF DISPLAYING A CONTENT OF OPERATION

CROSS-REFERENCE TO RELATED APPLICATIONS

The present application claims priority Japanese Patent Application No. JP 2006-225680, filed in the Japanese Patent Office on Aug. 22, 2006, the entire content of which is incorporated herein by reference.

BACKGROUND OF THE INVENTION

1. Field of the Invention

The present invention relates to a recording-reproduction apparatus, a reproduction apparatus, a recording apparatus, an image-capturing recording-reproduction apparatus, and a method of displaying the content of operation suitably applied to display the contents of operations, such as methods of recording, reproducing, and pausing operations, in a predetermined operating-content-viewing region.

2. Related Art

In a recording-reproduction apparatus, an image-capturing recording-reproduction apparatus, and the like, each having a recording function and a reproducing function, buttons and keys for carrying out operations, such as reproduction and pause, are independently provided depending on respective operations thereof. In other words, for carrying out each operation, any key or button provided for such an operation may be selected. In addition, recording, fast-forward, and rewind operations have been also assigned to specific buttons and used, respectively.

Furthermore, for effectively using the limited space on the apparatus, the operations of reproduction, fast-forward, rewind, and the like may be assigned to four operational directions (i.e., up-and-down and left-and right directions) of a joystick to allow such operations to be performed by operating the joystick in four directions.

Japanese Unexamined Patent Application Publication No. 8-235680 (JP 8-235680 A) discloses how to realize all operations for reproduction of an image by moving a joystick-like lever in four directions.

Japanese Unexamined Patent Application Publication No. 2003-110911 (JP 2003-110911 A) discloses guide-indications for functions, which are respectively assigned on four operational directions of a joystick on a finder.

SUMMARY OF THE INVENTION

When the fast-forward and rewind operations are assigned to specific buttons and then used, such assignments of the operations to the respective buttons may have to be completed in advance; however, may be time-consuming. When a joystick is used as an operation element, the current operational state of an apparatus for reproduction, recording, or the like, may be hardly recognized. Therefore, it may be difficult to make a decision in selecting a subsequent operation.

According to embodiments of the present invention, various operations for recording or reproduction may properly be switched from one function to another in a simple manner.

In an embodiment of the present invention, when a dynamic image is captured and the dynamic image is then recorded or reproduced, a discrimination figure that represents the current operating status of a recording-reproduction apparatus is displayed in the center of a certain operating-content-viewing region. In addition, a plurality of discrimination figures is displayed as guiding signs in the periphery of the discrimination figure displaying the current operating status. Here, the discrimination figures are provided as guiding signs to which contents of recording or reproduction operations are assigned. When a specific discrimination figure is selected from the discrimination figures provided as the guiding signs, the recording-reproduction unit is allowed to carry out an operation corresponding to the selected specific discrimination figure. The selected discrimination figure is transferred to the center of the operating-content-viewing region as a discrimination figure displaying a current operating status, while the discrimination figure being displayed in the center of the operating-content-viewing region is transferred in the same moving direction to which the selected discrimination figure has moved.

Consequently, a discrimination figure that represents the current operating status of an apparatus displayed in the center of the operating-content-viewing region may be changed with a discrimination figure displayed as a guiding sign in the periphery thereof in response to the content of operation.

According to the embodiment of the present invention, therefore, various operations for recording or reproduction may be easily changed with one another without failure. This is due to the fact that discrimination figure that represents the current operating status of the apparatus displayed in the center of the operating-content-viewing region may be changed with the discrimination figure displayed as a guiding sign in the periphery thereof in response to the content of operation.

BRIEF DESCRIPTION OF DRAWINGS

FIG. 4A, FIG. 4B, FIG. 4C, and FIG. 4D illustrate different exemplified displays, respectively;

FIG. 6 is a flowchart illustrating an example of processing at the time of NXT operation or PRV operation according to present embodiment of the present invention, where FIG. 6A and FIG. 6B illustrate different exemplified operations, respectively;

FIG. 7 is an explanatory diagram illustrating an example of a display of the operating-content-viewing region according to an embodiment of the present invention;

FIG. 15 is an explanatory diagram illustrating an example of a display of the operating-content-viewing region according to another embodiment of the present invention, where

DESCRIPTION OF PREFERRED EMBODIMENTS

Hereinafter, an embodiments of the present invention will be described with reference to FIGS. 1 to 6.

Figure 1:
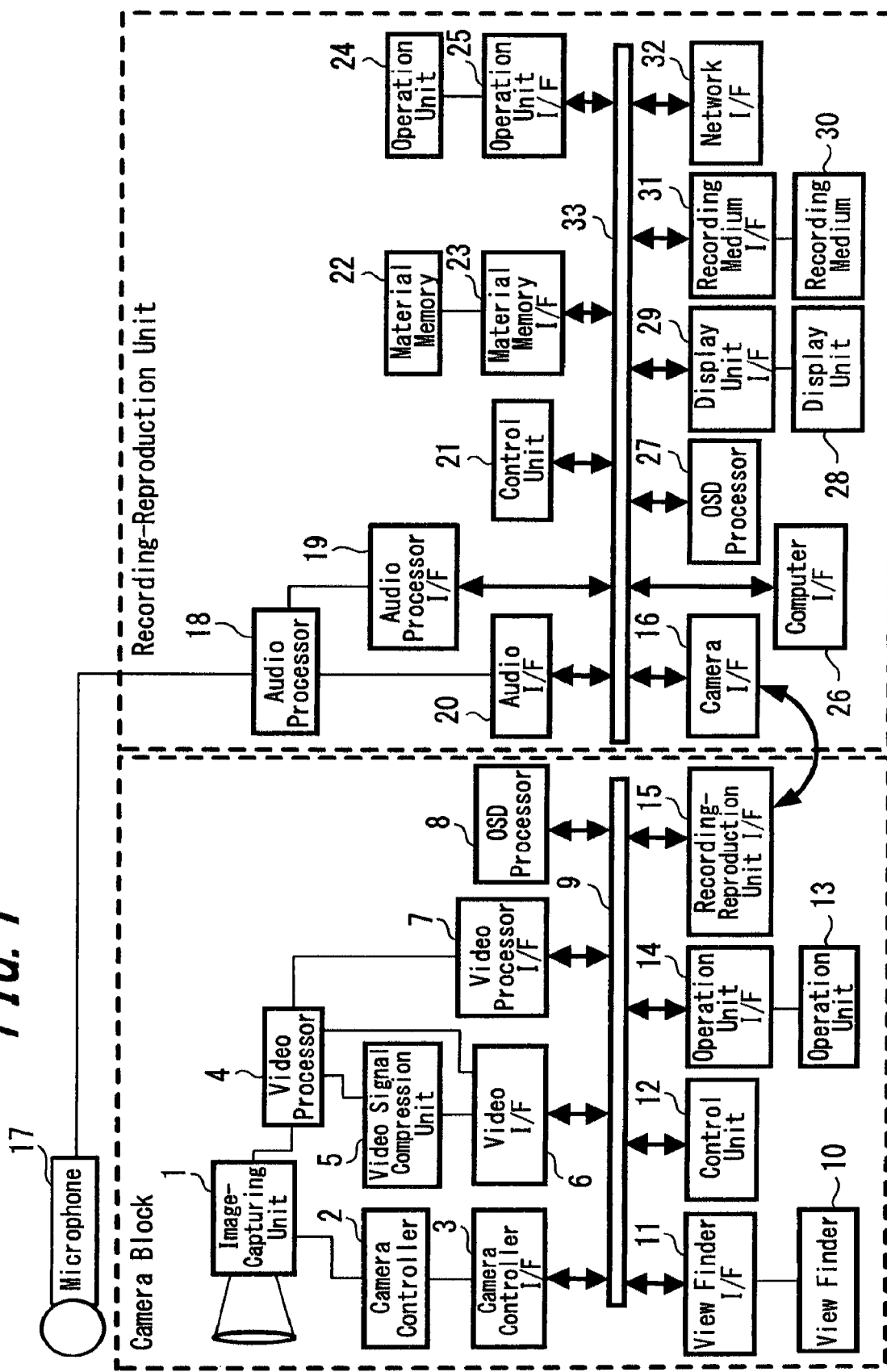
FIG. 1 is a block diagram illustrating an example of the configuration of a recording-reproduction apparatus according to an embodiment of the present invention.

The present embodiment is applied to a recording-reproduction apparatus having a cross key capable of switching various operations for recording or reproduction from one to another. FIG. 1 is a block diagram illustrating an exemplified configuration of the recording-reproduction apparatus according to the present embodiment. In this embodiment, the recording-reproduction apparatus includes a camera block for capturing a dynamic image (i.e., image data) and a recording-reproduction unit for recording or reproducing the image data taken by the camera block.

The camera block will be described. In the recording-reproduction apparatus shown in FIG. 1, an image-capturing unit 1 includes a lens. Thus, the image-capturing unit 1 can form an optical image of a subject through the lens and then generate an image signal by photoelectric conversion of the optical image. For capturing images with the image-capturing unit 1, an opening size of an aperture (not shown) is adjusted under the control of a camera controller 2. In addition, the focus of the lens is also adjusted to fit to the subject located at a desired position. The camera controller 2 is connected to a transmission line 9 via a camera controller interface (hereinafter, the interface will be referred to as I/F) 3. The transmission line 9 transmits various kinds of signals, data, and the like to different units, respectively.

Each unit of the camera block is designed to carry out processing under the control of a control unit 12 including a microcomputer and the like. The control unit 12 includes a read only memory (ROM) and a random access memory (RAM). The ROM stores a program for controlling the respective units, while the RAM temporary stores data if needed.

An image signal generated from the image-capturing unit 1 is supplied to a video processor 4 under the control of the control unit 12. The video processor 4 includes an analog/digital signal converter (not shown) to convert an input image signal into a digital signal. In addition, the video processor 4 includes an image-signal processor (not shown) to carry out digital-signal processing on the digital signal. The digital-signal processing to be performed may include, for example, a knee correction that compresses an image signal of more than a predetermined level, a gamma correction that corrects the level of an image signal according to a pre-set gamma curve, and white-clip or black-clip processing that restricts the signal level of an image signal within a predetermined range. The video processor 4 operates according to a control signal from the control unit 12. In other words, the control signal is supplied from the control unit 12 to the video processor 4 through a video processor I/F 7.

An image signal subjected to image-processing in the video processor 4 is transferred along a transmission line 9 via a video I/F 6 and then supplied to a view finder 10 (i.e., a display unit) through a view finder I/F 11, followed by being displayed as an image. When characters, numerals, graphic symbols, or the like may be displayed for any kind of information, an on-screen-display (OSD) processor 8 generates a signal for an on-screen display and combines the signal with an image signal, followed by supplying the combined image signal to the view finder 10 through the view finder I/F 11. In the present embodiment, an icon (discrimination figure) displaying the current operating status of the recording-reproduction apparatus, such as reproduction or pause, or an icon representing the content of operation to be shifted from such a state is designed to be displayed on a certain operating-content-viewing region on the view finder 10. The OSD-processor 8 generates a display command signal for this case. The icon displayed in the operating-content-viewing region is designed to be changed with another one in conjunction with the operation of a cross key on an operation unit 13 as described later. In each case, the OSD-processor 8 generates a display command signal.

The view finder 10 includes, for example, a liquid crystal panel. The view finder 10 displays an image being captured by the image-capturing unit 1 or an image reproduced from one recorded on the recording-reproduction unit. The view finder 10 also displays metadata, attribute data of the picture-mage data, in addition to the picture image.

The image signal output from the video processor 4 is also supplied to a video-signal compression unit 5. In the video-signal compression unit 5, encoding processing for converting an image signal into one with the MPEG (Moving Picture Experts Group) system or the like. The encoded image signal is transmitted to the recording-reproduction unit under the control of the control unit 12 and then recorded on each portion of the recording-reproduction unit. The video processor 4 is also designed to generate image data for editing, which is referred to as proxy data. At the time of proxy data generation, for example, the video processor 4 compresses the image data with the MPEG-4 system and carries out processing of converting the image data into low-resolution image data.

In addition, the camera block includes an operation unit 13 including operation elements (not shown), for example, buttons and knobs for camera control, such as a gain switch for switching the gains of image signals, a cross key (not shown), and the like. Here, various kinds of operations for recording or reproduction are assigned to the cross key. Details of the operation of the cross key, the assigned functions, and the like will be described later.

Next, the configuration of the recording-reproduction unit will be described. The recording-reproduction unit is also designed so that each portion thereof may be controlled by a control unit 21 including a microcomputer or the like. The recording-reproduction unit includes a camera I/F 16 for data exchange with the camera block. In addition, the recording-reproduction unit connects with a microphone 17. Any sound signal captured by the microphone 17 is supplied to an audio processor 18. The audio processor 18 performs sound-adjustment processing, such as amplification, on an input sound signal. Besides, the audio processor 18 generates a sound digital signal by carrying out analog-to-digital conversion. The audio processor 18 operates with a control signal from the control unit 21. In other words, the control signal from the control unit 21 is supplied to the audio processor 18 via an audio processor I/F 19. A sound digital signal generated from the audio processor 18 is combined with an image signal incorporated from the camera I/F 16 under the control of a control unit 21, thereby providing image data.

The combined image data is transmitted as one clip from the initiation of recording to the termination thereof to a material memory 22 though a material memory I/F 23. In addition, if desired, such data may be transferred to a computer connected through a computer I/F 26 or an external device through a network I/F 32. These data transmissions may be carried out through a transmission line 33. Furthermore, a recording medium I/F 31 is connected to the transmission line 33. In addition, the recording medium I/F 31 is connected to a recording medium 30, such as a memory card. The recording medium 30 may be functioned as a medium on which, for example, proxy data or the like generated from the video processor 4 of the camera block will be recorded. In addition, the recording medium 30 may be also functioned as a medium in use of an application to reflect the contents of settings, for example, on the recording-reproduction apparatus. In other words, in such an application, camera-setting data (i.e., data for preparation of shooting) or the like may be previously recorded and the contents of the settings may be read out of the recording medium 30 through the recording medium I/F 31 before the shooting. In this case, a hard disk drive (HDD) or an optical disk drive may be used as the recording medium to be connected with the recording medium I/F 31.

The combined image data is also supplied to an OSD-processor 27. Then, the OSD-processor 27 generates signals for displaying any kind of information on a display unit 28, such as characters, numerals, and graphic symbols, followed by combining the signals with image signals. The combined image signals are then supplied to a display unit 28 through a display unit I/F 29. Signals to be generated from the OSD-processor 27 include display command signals for displaying icons (discrimination figures). The icons include those provided for representing the current operating status of the recording-reproduction apparatus, such as reproduction or pause, on a certain operating-content-viewing region on the display unit 28. In this case, the icons also include those provided for representing the content of an operation, which may be transferred from such a state, on the above viewing region. These icons displayed in the operating-content-viewing region are designed to be switched to one another in conjunction with the operation of a cross key on an operation unit 24 as described later. In each case, the OSD-processor 27 generates a display command signal.

The display unit 28 includes, for example, a liquid crystal panel. The display unit 28 displays an image under shooting by the image-capturing unit 1 or a reproduced picture image which has been recorded on the recording-reproduction unit. The display unit 28 also displays metadata, attribute data of the picture-mage data, in addition to the picture image.

Furthermore, the recording-reproduction unit includes an operation unit 24. The operation unit 24 is provided for, for example, ordering a recording operation for each portion of the recording-reproduction unit or ordering a reproduction operation for the image data being recorded. The cross key, which is described as the operation unit 13 of the camera block, is provided as a common operation element for both the camera block and the recording-reproduction unit.

Figure 2:
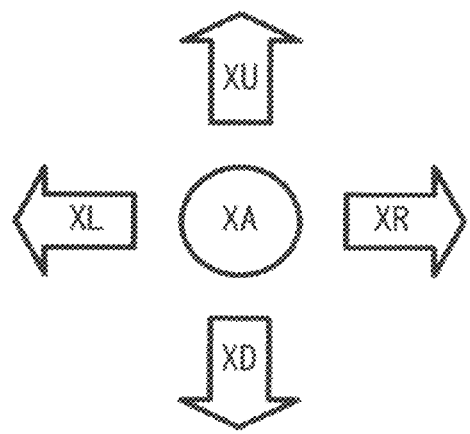
FIG. 2 is an explanatory diagram illustrating an example of the configuration of a cross key according to an embodiment of the present invention.

FIG. 2 is a diagram illustrating an exemplified configuration of the cross key. The cross key includes four allow keys representing different operation directions XU, XL, XD, and XR in clockwise from the upper side of the plane and a circular key XA in the center of the plane. The key XL or XR is designed so that a series of operation commands for reproduction or recording may mutually be switched when the key is depressed. In the present embodiment, for example, operations for reproduction, REV ×15 (15× rewind)—REV ×4 (4× rewind)—PAUSE (pause)-PLAY (reproduction)—FF ×4 (4× fast-forward)—FF ×15 (15× fast-forward), are assigned to XL and XR on the X axis of the cross key, respectively. By depressing the XL key, these operations are temporally switched in the reverse direction (in this case, in the left direction). By depressing the XR key, these operations are temporally switched in the forward direction (in this case, in the right direction). In addition, by repeatedly depressing the respective keys for the predetermined number of times, the rates of the corresponding operations may be also switched to one another.

Figure 3:
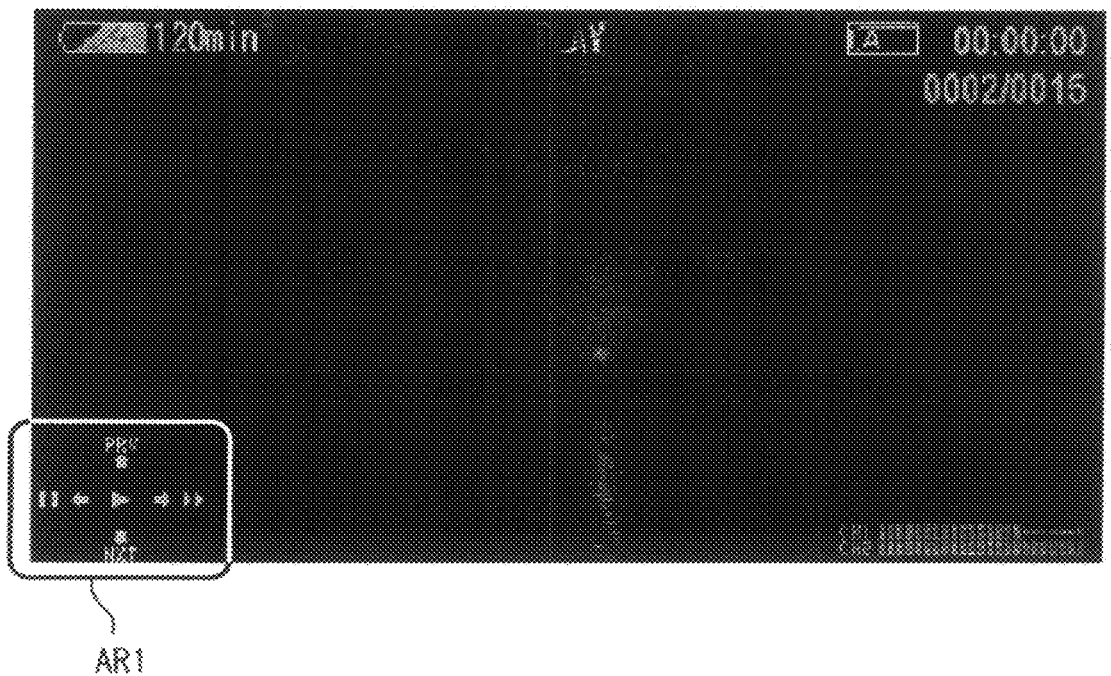
FIG. 3 is an explanatory diagram illustrating an example of a display of the operating-content-viewing region according to the embodiment of the resent invention.

For visually observing the current content of operation (operating status), in the present embodiment, the operating-content-viewing region for displaying the content of operation is provided on the view finder 10 or the display unit 28. Referring to FIG. 3, an example of the display of the operating-content-viewing region is shown. In other words, FIG. 3 illustrates a displayed screen when image data recorded on the material memory 22 or the like is reproduced. A squared region at the lower left of the screen is the operating-content-viewing region AR1. The position of the operating-content-viewing region AR1 being displayed is not limited to the lower left of the screen; however, may be located any positions on the screen.

An icon indicating reproduction is displayed in the center of the operating-content-viewing region AR1. On the right thereof, an icon indicating 4× fast-forward is displayed. In addition, an icon indicating pause is displayed on the opposite side. A PRV icon, which replaces the currently-displayed clip with the previous clip, is located above. A NXT icon, which replaces the currently-displayed clip with the next clip, is located below.

The operating-content-viewing region AR1 is designed so that any icon may be displayed or hidden by switching on-off the button or the like on the operation unit. Even in the case of being set hidden, it is also designed so that the icons may be automatically displayed when it detects an operation with the cross key, while the icons may be automatically hidden when any operation with the cross key cannot be detected for a given period of time.

Figure 4:
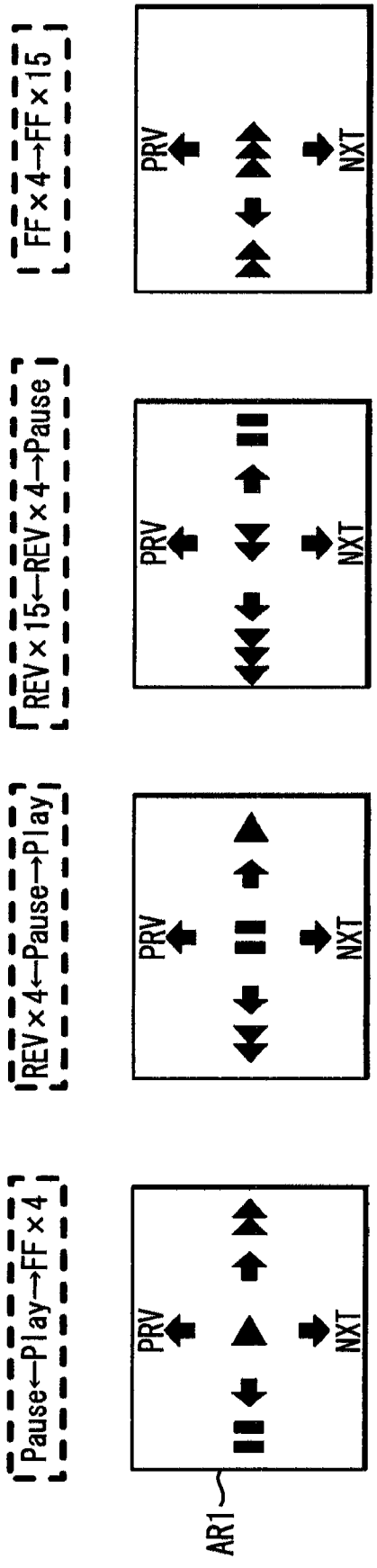
FIG. 4 is an explanatory diagram illustrating an example of a display of the operating-content-viewing region according to the embodiment of the present invention, where

Furthermore, the icons to be displayed in the operating-content-viewing region AR1 may be changed according to the operation of the cross key. FIG. 4 illustrates an example of transition of displays in response to the cross-key operation. FIG. 4A illustrates an exemplified display when the reproduction operation of image data is performed and the image data is being reproduced. The icon indicating reproduction is displayed in the center of the operating-content-viewing region AR1. The icons as guiding signs are displayed such that PRV, PAUSE, NXT, and 4× fast-forward are displayed in counterclockwise order from the upper side of the screen. Under such a condition, when the pause is just needed, the cross key may be tilted to the left.

FIG. 4B illustrates an exemplified display of actually tilting the cross key to the left (depressing the XL key). In FIG. 4B, the pause icon shifts to the center of the operating-content-viewing region AR1. In connection with such an operation, the icon indicating reproduction is shifted to the right.

Subsequently, at a position corresponding to the XL key on the left side of the cross key, an icon indicating 4× rewind is additionally displayed.

In the state shown in FIG. 4B, when the cross key is further tilted to the left (depressing the XL key), the state is changed from the pause to the 4× rewind. In contrast, as shown in FIG. 4C, the content displayed in the operating-content-viewing region AR1 is also changed. In FIG. 4C, the icon indicating 4× rewind shifts from the left side of the screen to the center thereof where the current operating status is displayed. Concurrently, the icon indicating pause is shifted to the right side of the screen. Furthermore, an icon indicating 15× rewind is additionally displayed on the left side of the screen. When there is no assigned operation to the any further subsequent operations by depressing the cross key in the operating direction of the cross key, as shown in FIG. 4D, there is no longer a display on the position on the right side of the screen, where the content of additional operation may be subsequently shifted.

Figure 5:
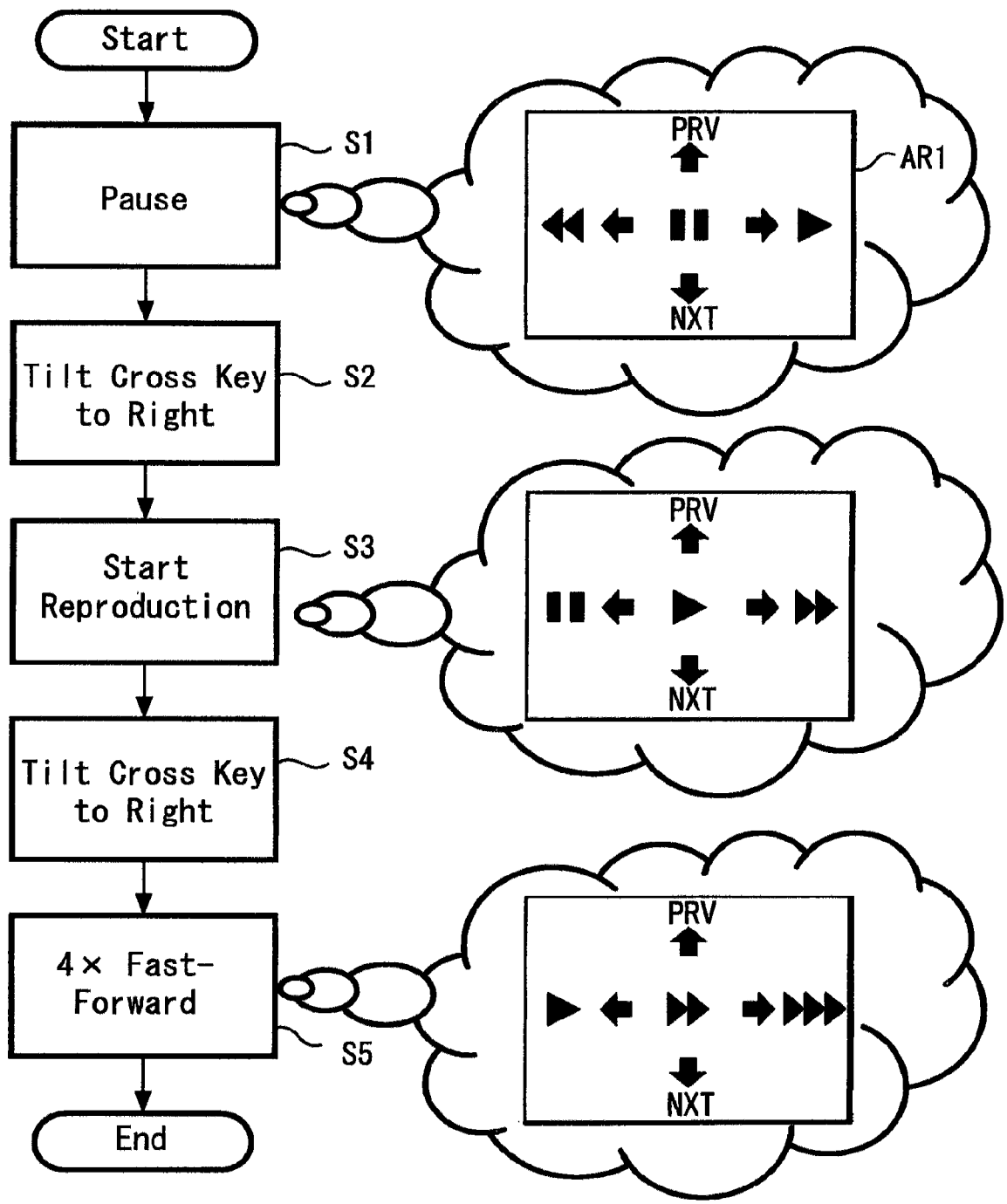
FIG. 5 is a flowchart illustrating an example of processing the operation of a cross key according to present embodiment of the present invention.

FIG. 5 illustrates a flowchart representing the transition of operating status according to the operation of the cross key and a change of the screen due to the transition. First, if any key of the cross key or other buttons on the operation unit is depressed or the like to select the pause (Step S1), then the operation status is paused. As a result, the icon indicating pause may be displayed in the center of the operating-content-viewing region AR1 in response to the processing carried out in the OSD-processor. Under such a condition, if the cross key is tilted to the right (depressing the XR key) (Step S2), the reproduction is initiated under the control of the control unit 21 (Step S3). Subsequently, in the operating-content-viewing region AR1, the icon indicating reproduction is shifted to the center of the screen displaying the current status while the icon indicating pause is shifted to the left.

Here, the cross key is further tilted to the right (depressing the XR key) (Step S5) to switch the operating status to the 4× fast-forward under the control of the control unit 21 (Step S5). Subsequently, in the operating-content-viewing region AR1, the icon indicating reproduction is shifted to the left side of the screen, while the icon indicating 4× fast-forward is shifted to the center of the screen displaying the current operating status.

The icons of PRV at the upper side and NXT at the lower side of the screen correspond to XU and XD keys of the cross key, respectively. For example, when the XU key of the cross key is depressed while the PRV icon is displayed at the upper side of the screen, the head of a clip being selected is displayed and then reproduced from the head. When the XD key is depressed, another clip being recorded at a later time is selected and displayed. Furthermore, if the XU or XD key is depressed a plurality of times, a clip that is displayed earlier or later than the number of clips corresponding to the number of the times the key is depressed, may be selected and displayed.

When a selective operation of PRV or NXT is carried out by depressing the XU or XD key, a clip temporally earlier or later than other clips is selected and operated on the basis of the operating status at the time of key operation. An example of the operation in this case is illustrated in the flow chart of FIG. 6. FIG. 6A illustrates an exemplified operation when NXT or PRV is selected in the pause or rewind state. In FIG. 6A, the pause or rewind operation is carried out first (Step S11). Subsequently, when NXT or PRV is selected by the operation of the cross key or the like (Step S12), the reproduction is paused at the head of the destination clip (Step S13).

FIG. 6B illustrates an exemplified operation when NXT or PRV is selected in the reproduction or fast-forward state. After having carried out the reproduction or fast-forward operation (step S21), NXT or PRV is selected by operating the cross key or the like (Step S22), and the destination clip starts to reproduce from the head (Step S23).

As described above, the operations of reproduction, pause, and the like are assigned to the respective operating directions of the cross key. Accordingly, independent keys corresponding to the respective operations may no longer be used, thereby realizing space-saving.

Furthermore, when the cross key is tilted to the right, the operation for reproduction turns to the temporally forward direction. When the cross key is tilted to the left, the operation turns to the temporally backward direction. Therefore, various kinds of operations may mutually be switched without leaving a user's hand from one key. Besides, a suitable operation may be intuitively selected.

Furthermore, the current status of the recording-reproduction apparatus is displayed as an icon in the center of the operating-content-viewing region of the display unit. In contrast, the content of operation to be moved as a guiding sign is displayed as an icon in the periphery thereof. Therefore, it is possible to carry out an appropriate operation. The current operating status may be easily displayed in the center of the operating-content-viewing region, so that the current operating status may easily be observed visually.

Furthermore, each icon displayed in the operating-content-viewing region may be replaced with another one in response to the operation of the cross key. Thus, the icons may be suitably displayed on a constant basis and a suitable operation may be realized without operational failure.

In addition, in the embodiment as described so far, the operations, REV ×15 (15× rewind)—REV ×4 (4× rewind)—PAUSE (pause)-PLAY (reproduction)—FF ×4 (4× fast-forward)—FF ×15 (15× fast-forward), are assigned to XL and XR on the X axis of the cross key. In this case, for example, it is necessary to perform the operation of tilting the XL key to the left three times when the state of 15× fast-forward is desired to be paused. In contrast, as shown in FIG. 7, for quickly shifting to the pause operation even in the state of fast-forward, the pause operation may be assigned next to the fast-forward operation. In FIG. 7, the pause operation is therefore assigned next to the fast-forward operation. Similarly, for quickly shifting to the pause operation even in the state of rewind, the pause operation may be assigned next to the rewind operation.

Figure 8:
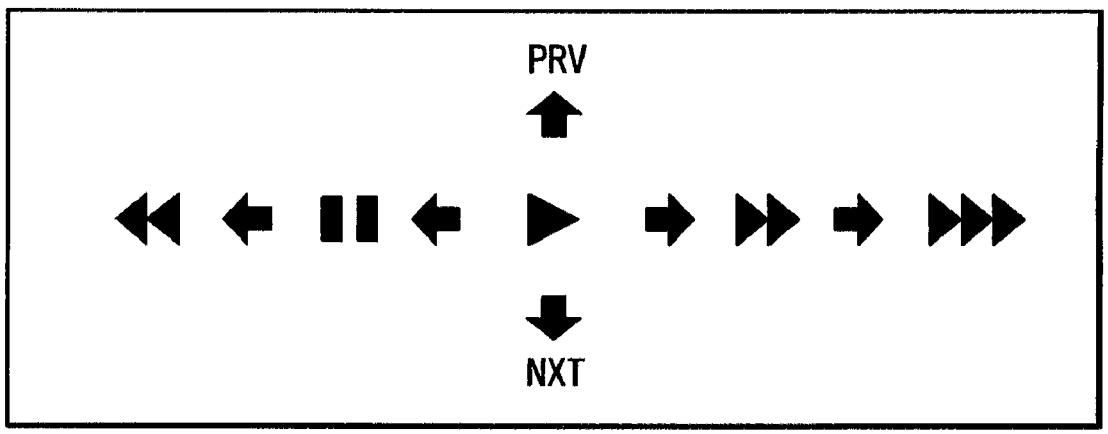
FIG. 8 is an explanatory diagram illustrating an example of a display of the operating-content-viewing region according to another embodiment of the present invention.

In addition, in the embodiment as described so far, the icons, provided as guiding signs, are respectively displayed in the four directions in the periphery of the icon indicating the current operating status. Alternatively, when the size of the viewing region is sufficiently wide, as shown in FIG. 8, a plurality of icons (in this case, two icons) may be designed to be displayed in the direction of XL or XR key of the cross key, or a plurality of icons may be displayed in the vertical direction.

Figure 9:
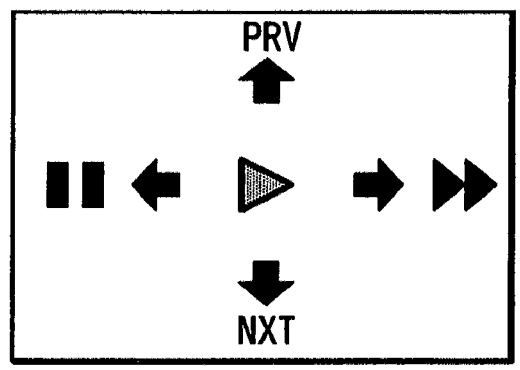
FIG. 9 is an explanatory diagram illustrating an example of a display of the operating-content-viewing region according to another embodiment of the present invention.

In addition, in the embodiment as described so far, all icons are displayed in a single color. Alternatively, as shown in FIG. 9, the color of the icon representing the current operating status in the center of the screen may be different from the colors of other icons.

Figure 10:
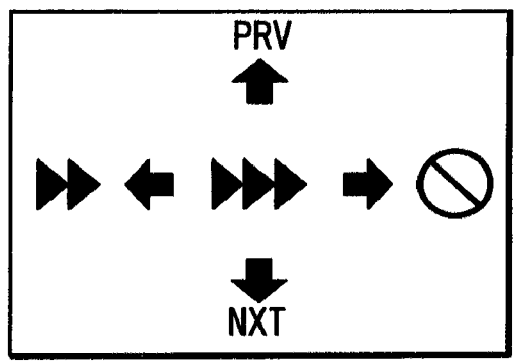
FIG. 10 is an explanatory diagram illustrating an example of a display of the operating-content-viewing region according to another embodiment of the present invention.

In addition, in the embodiment as described so far, when the operations assigned to the cross key are no longer applied to the respective four directions that have once assigned to the cross key, the screen no longer displays any indication. Alternatively, as shown in FIG. 10, any icon, such as indicating "BLOCKED", may be displayed for intelligibly indicating that the content of operation no longer changes even the key is depressed in such a direction.

Figure 11:
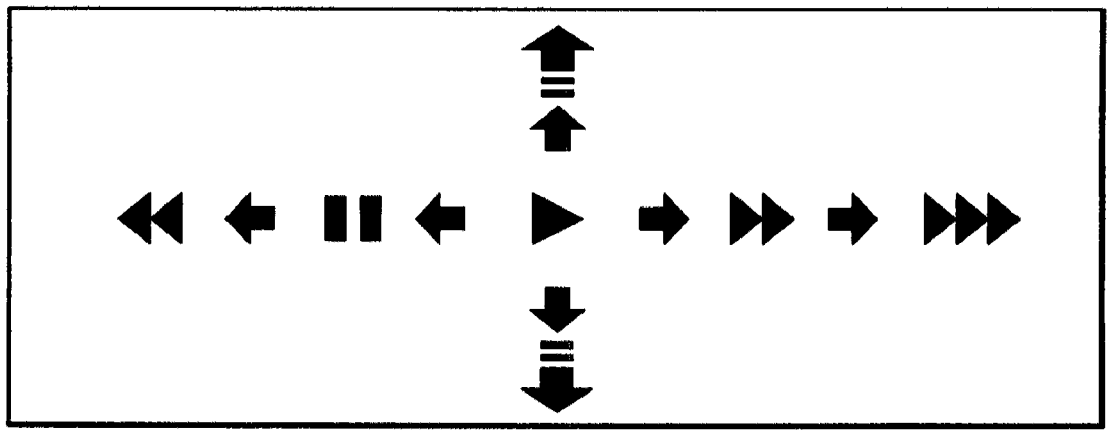
FIG. 11 is an explanatory diagram illustrating an example of a display of the operating-content-viewing region according to another embodiment of the present invention.

In addition, in the embodiment as described so far, the "PRV" icon for shifting to the previous clip or the "NXT" icon for shifting to the next clip are displayed with characters "PRV" and "NXT", respectively. Alternatively, as shown in FIG. 11, these may be displayed with icons, respectively.

Figure 12:
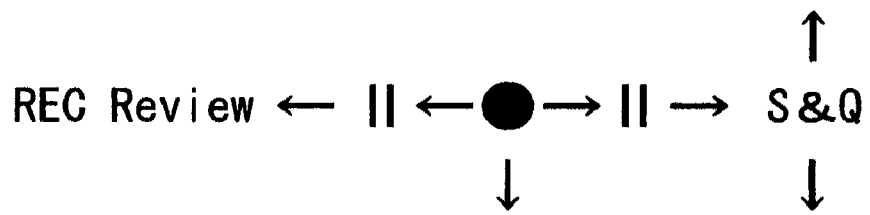
FIG. 12 is an explanatory diagram illustrating an example of a display of the operating-content-viewing region according to another embodiment of the present invention.

In addition, in the embodiment as described so far, the operation for reproduction is assigned to the cross key. Alternatively, the operation for recording may be configured to change the reproduction operation (reproduction mode) and the recording operation (recording mode) by switching the operation directions of the cross key. An example of a display of icons in this case is shown in FIG. 12. In other words, FIG. 12 shows an example of a display of icons displayed in the operating-content-viewing region AR1 when the XA key in the center of the cross key is depressed to shift to perform the recording operation.

In FIG. 12, the recording operation is indicated by a black circle and the pause operations are assigned to both sides of such a recording icon. The cross key is tilted to the left (depressing the XL key) to select the pause and then the cross key is tilted to the left side (depressing XL) while keeping such a state. Even if the operation does not switch to the reproduction mode, the operation is designed to shift to the REC Review mode where an image captured just before the switching may be reproduced.

Furthermore, the cross key is tilted to the right (depressing the XR key) to select the pause operation while recording is being performed, and the cross key is tilted to the left (depressing the XR key) while maintaining such a state thereafter. As a result, the operation state can be switched to the slow-and-quick (S & Q) motion mode where the recording may be performed by switching to any frame rate. Thus, the functions except of those for reproduction and recording may be assigned to the cross key to display icons corresponding to the respective operations in the operating-content-viewing region.

Figure 13:
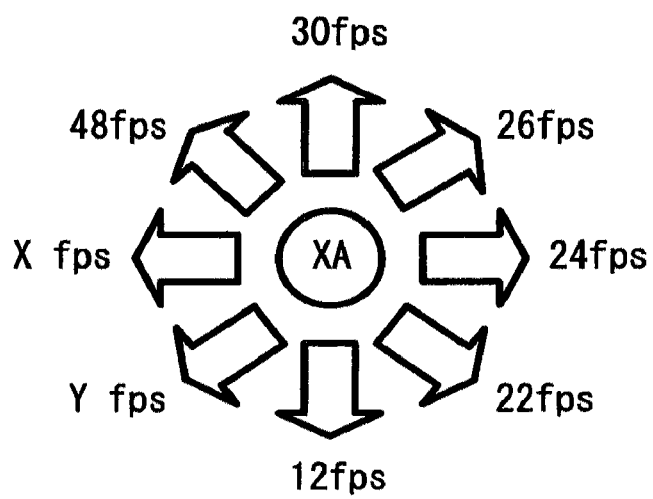
FIG. 13 is an explanatory diagram illustrating an example of the configuration of a cross key according to another embodiment of the present invention.

In the S & Q motion mode, for more finely changing the frame rate, operation elements are not only limited to be assigned to four directions, vertical and horizontal directions. As shown in FIG. 13, different frame-rate setting values may be assigned to plural directions (eight directions in this case) as shown in FIG. 13 to switch the flame rates by the operating-direction conversion of the operation element. As is in the case of the indication as shown in FIG. 13, for example, when the operation element is tilted upward, the frame rate may be switched to 30 frames per second (frp). In contrast, when it is tilted obliquely right upward, the frame rate may be switched to 26 fps. When tilted to the right direction, the frame rate may be switched to 24 fps. The alphabets X and Y placed on the portions displayed by X fps and Y fps represent unspecified frame rate values, respectively. The arrangement of defined frame-rate values shown in FIG. 13 is only provided for illustrative purposes, so that the present invention will not be limited to such an arrangement. Furthermore, in this case, the operation element may be any key, except of the cross key. As shown in FIG. 13, therefore, the key may be of another form capable of responding to the switching to any of many directions. Thus, the switching to any of plural defined frame-rate values may be attained.

Furthermore, in the embodiment as described above, the recording operation may be initiated by depressing the XA key of the cross key. The reproduction mode and the recording mode may mutually be switched by depressing the XU key or depressing the XD key. In this case, an example of assigning the respective functions to the cross keys is shown in FIG. 14.

Figure 14:
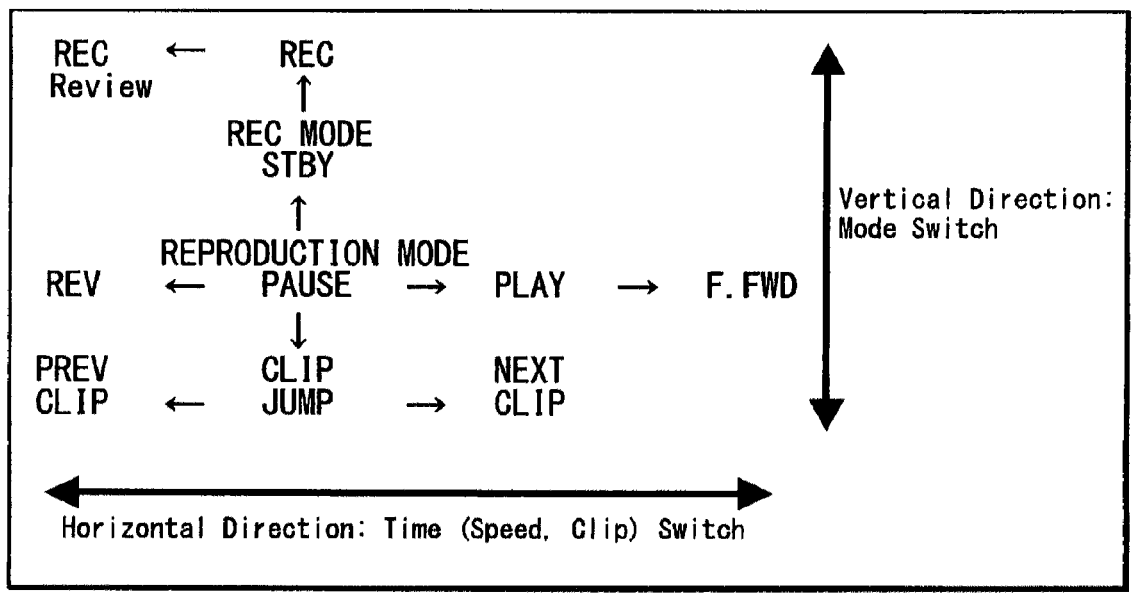
FIG. 14 is an explanatory diagram illustrating an example of assigning operations to a cross key according to another embodiment of the present invention.

In FIG. 14, the cross key may be tilted up and down (depressing the XU key or XD key) to switch the reproduction, recording, and clip-to-clip movement modes from one to another. In addition, the cross key may be tilted right and left (depressing the XL key or XR key) to switch the time directions and speeds for each operation in the mode.

Figure 15A:
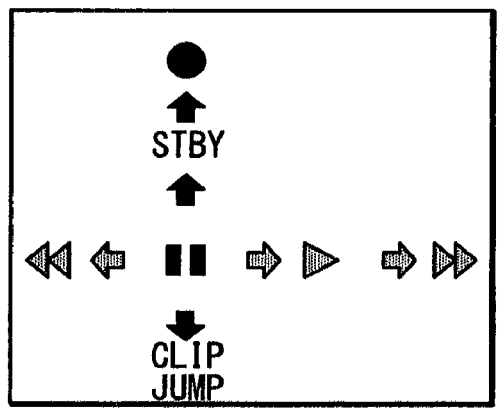
FIG. 15A, FIG. 15B, and FIG. 15C illustrate different exemplified displays, respectively.

FIG. 15 illustrates an example of displaying each icon in the operating-content-viewing region when the functions are assigned to the cross key as illustrated in FIG. 14. FIG. 15A illustrates an example of display in the state where the reproduction is paused. Icons indicating reproduction operation are displayed in right and left directions, respectively. In addition, icons indicating recording operation and icons indicating CLP and JUMP modes for moving between clips are displayed in up and down directions, respectively. In FIG. 15A, in order to make the mode under selection distinguishable, different colors may be used for the representation of icons. Thus, any operation icon in the mode under selection may be displayed by another color.

Figure 15B:
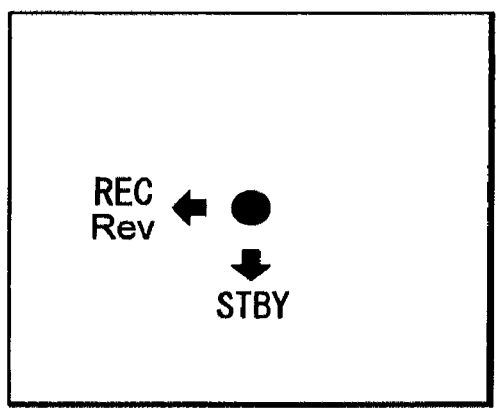

Referring now to FIG. 15B, an example of display in the case of tilting the cross key two times upward (depressing the XU key two times) in the state shown in FIG. 15A. In the state shown in FIG. 15A where the reproduction is paused, the recording is initiated by tilting the cross key two times upward. Upon initiating the recording, the icons indicating recording are shifted to the center of the screen where the current operational state is displayed.

Figure 15C:
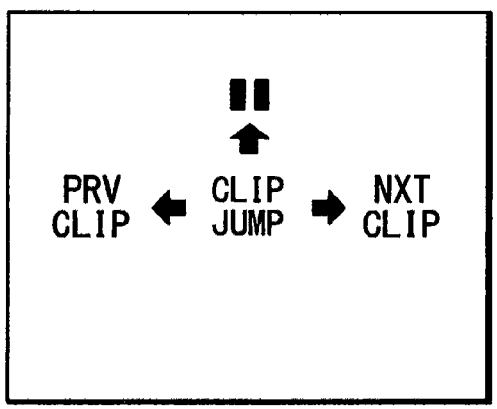
Figure 16:
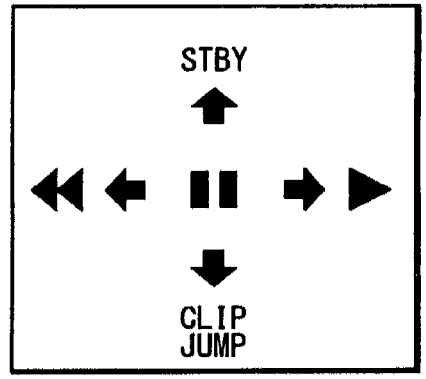
FIG. 16 is an explanatory diagram illustrating an example of a display of the operating-content-viewing region according to another embodiment of the present invention.

Referring now to FIG. 15C, an example of a display in the case of tilting the cross key downward (depressing the XD key) in the state shown in FIG. 15A. In other words, FIG. 15C illustrates that, in the state of FIG. 15A where the reproduction is paused, the CLIP_JUMP mode is selected by tilting the cross key downward. An icon indicating the CLIP_JUMP mode is shifted to the center of the screen that represents the current operational state, while the icon indicating pause is shifted in the upward direction of the screen. Furthermore, FIG. 14A illustrates an example in which a plurality of icons provided as guiding signs are displayed in four directions, respectively. In contrast, as shown in FIG. 16, one operation may be assigned to each of the four directions and displayed.

The embodiments of the present invention have employed a cross key as an operation element; however, the shape of the key may be a square, a circle, or the like, which may be switched to any of the four directions, such as up-and-down and right-and-left directions.

Furthermore, the embodiments have been described so far have demonstrated the recording-reproduction apparatus capable of carrying out both the recording and the reproduction. However, the present invention may be various kinds of apparatuses, such as a recording apparatus that only performs a recording operation, a reproduction apparatus that only performs a reproduction operation, or an image-capturing recording-reproduction apparatus including all these functions.

It should be understood by those skilled in the art that various modifications, combinations, sub-combinations and alterations may occur depending on design requirements and other factors insofar as they are within the scope of the appended claims or the equivalents thereof.

What is claimed is:

1. A recording and/or reproducing apparatus for displaying operating status thereof, said apparatus comprising:
   an operation unit having an operation element and including a cross key having a plurality of allow keys respectively representative of a plurality of operating directions available to the operation unit, a control unit configured to display a discrimination figure indicating a current operating status of the apparatus in a center of an operating-content-viewing region and generate a display command signal for displaying a plurality of discrimination figures in a periphery of the discrimination figure indicating the current operating status that are provided as guiding signs with contents of recording or reproduction operations being assigned, and an output unit configured to output a display signal prepared from the display command signal generated from the control unit, wherein the control unit outputs, when a specific discrimination figure is selected from the discrimination figures as guiding signs by operating the operation unit, a command signal that instructs a unit to carry out an operation corresponding to the selected specific discrimination figure;

the control unit generates a display command signal for moving the selected discrimination figure as a discrimination figure indicating the current operating status to the center of the operating-content-viewing region, and moving the discrimination figure displayed in the center of the operating-content-viewing region in a same moving direction as that in which the selected discrimination figure has moved;

the operating-content-viewing region includes a plurality of icons corresponding to the allow keys and being respectively representative of the plurality of operating directions available to the operation unit, whereby the discrimination figure indicating the current operating status or the selected discrimination figure is located at the center of the operating-content-viewing region with the plurality of icons corresponding to the plurality of allow keys being located immediately adjacent thereto such that the plurality of discrimination figures as guiding signs are each located outward the plurality of icons in a direction away from the center of the operating-content-viewing region, and the plurality of discrimination figures include discrimination figures indicative of pause, play, fast forward in a first speed, fast forward in a second speed which is faster than the first speed, reverse in a third speed, and reverse in a fourth speed which is faster than the third speed, all of which are arranged in a horizontal straight line passing through the center of the operating-content-viewing region in a predetermined order, and include a previous clip discrimination figure that represents replacing a currently displayed clip with a previously displayed clip and a next clip discrimination figure that represents replacing the currently displayed clip with a next clip which are arranged in a vertical straight line passing through the center of the operating-content-viewing region such that one of the previous clip discrimination figure and the next clip discrimination figure is arranged above the center of the operating-content-viewing region and the other one of the previous clip discrimination figure and the next clip discrimination figure is arranged below the center of the operating-content-viewing region.

2. The apparatus according to claim 1, wherein the operation element carries out operations in at least four operating directions.

3. The apparatus according to claim 1, further comprising: a display unit, wherein the control unit allows the display unit to display the operating-content-viewing region on the basis of the display signal generated from the output unit.

4. The apparatus according to claim 1, wherein the discrimination figures indicative of pause, play, fast forward in the first speed, fast forward in the second speed, reverse in the third speed, and reverse in the fourth speed are arranged in the straight line passing through the center of the operating-content-viewing region in chronological order of recording or reproduction or in the order of speeds of recording or reproduction, and the direction and speed of the recording or reproduction changes in response to an operation signal from the operation element.

5. The apparatus according to claim 1, in which the discrimination figure indicating the current operating status or the selected discrimination figure located at the center of the operating-content-viewing region has a color which is different than that of the icons corresponding to the allow keys and the plurality of discrimination figures as the guiding signs located outward the plurality of icons which are displayed.

6. A method of displaying operating status of a recording and/or reproducing apparatus, comprising the steps of:

displaying a discrimination figure indicating a current operating status of the apparatus in a center of an operating-content-viewing region, displaying a plurality of discrimination figures in a periphery of the discrimination figure indicating the current operating status that are provided as guiding signs with contents of recording or reproduction operations being assigned, carrying out an operation corresponding to a selected specific discrimination figure when the specific discrimination figure is selected from the discrimination figures as guiding signs, moving the selected discrimination figure as a discrimination figure indicating the current operating status to the center of the operating-content-viewing region, and moving the discrimination figure displayed in the center of the operating-content-viewing region in a same moving direction as that in which the selected discrimination figure has moved, in which the operating-content-viewing region includes a plurality of icons corresponding to a plurality of allow keys of a cross key respectively representative of a plurality of operating directions available to the operation unit, in which the discrimination figure indicating the current operating status or the selected discrimination figure is located at a center of the operating-content-viewing region cross key with the plurality of icons corresponding to the plurality of allow keys being located immediately adjacent thereto such that the plurality of discrimination figures as guiding signs are each located outward the plurality of icons in a direction away from the center of the operating-content-viewing region, in which the plurality of discrimination figures include discrimination figures indicative of pause, play, fast forward in a first speed, fast forward in a second speed which is faster than the first speed, reverse in a third speed, and reverse in a fourth speed which is faster than the third speed, all of which are arranged in a horizontal straight line passing through the center of the operating-content-viewing region in a predetermined order, and include a previous clip discrimination figure that represents replacing a currently displayed clip with a previously displayed clip and a next clip discrimination figure that represents replacing the currently displayed clip with a next clip which are arranged in a vertical straight line passing through the center of the operating-content-viewing region such that one of the previous clip discrimination figure and the next clip discrimination figure is arranged above the center of the operating-content-viewing region and the other one of the previous clip discrimination figure and the next clip discrimination figure is arranged below the center of the operating-content-viewing region.

7. The method according to claim 6, in which the discrimination figure indicating the current operating status or the selected discrimination figure located at the center of the operating-content-viewing region has a color which is different than that of the icons corresponding to the allow keys and the plurality of discrimination figures as the guiding signs located outward the plurality of icons which are displayed.

* * * * *